Dec. 5, 1933.  R. R. WITHERELL  1,938,203
METHOD OF MAKING ROTARY GEAR PUMPS
Filed April 24, 1933
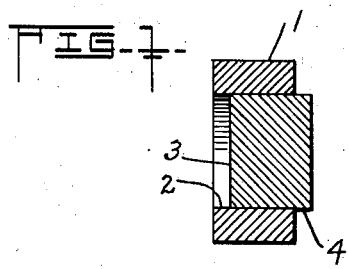
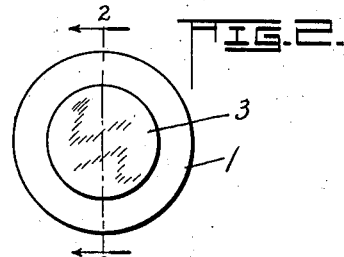
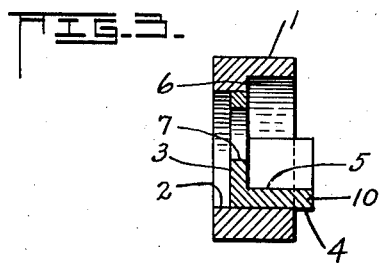
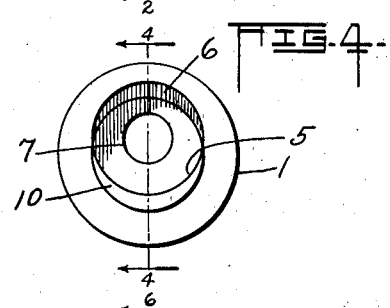
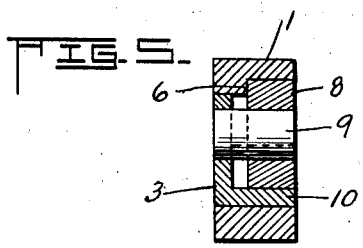
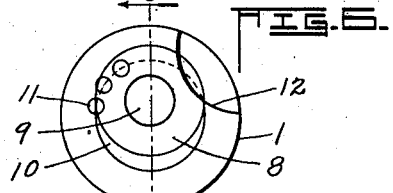
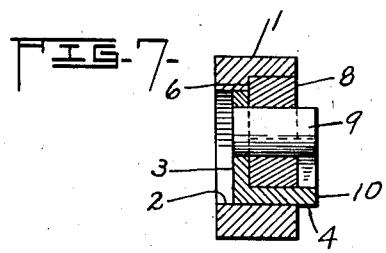
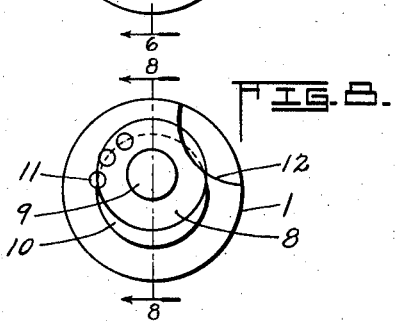
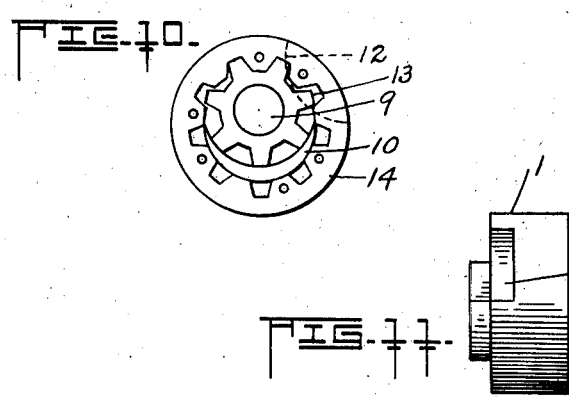
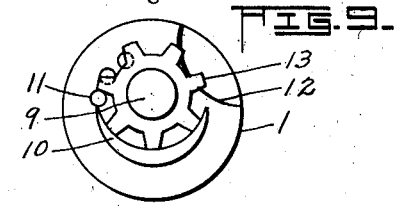
INVENTOR.
ROBERT R. WITHERELL
BY Langdon Moore
ATTORNEYS.

Patented Dec. 5, 1933

1,938,203

UNITED STATES PATENT OFFICE 1,938,203

METHOD OF MAKING ROTARY GEAR PUMPS

Robert R. Witherell, Bloomington, Ill.

Application April 24, 1933. Serial No. 667,655

5 Claims. (Cl. 29—156.8)

This invention relates to improvements in rotary gear pumps of the internal gear type and more particularly to the method of forming the crescent element of internal gear pumps.

In pumps of this type, the pinion gear is mounted eccentrically of the internal gear and the space between the teeth of the respective gears, resulting from the eccentricity, filled by a crescent extending above and integral with the member supporting the stud which rotatably mounts the pinion gear. It is necessary that the surface of the gears and the surface of the crescent supporting member as well as the surfaces of the crescent be machined and lapped. In forming the crescent integral with the crescent carrying element it has been found very difficult to machine and lap the upper surface of this element and to form square corners about the base of the crescent as well as to lap the surface embraced by the crescent.

It is an object of this invention to provide a method whereby the crescent element may be produced with precision from either cast iron or hardened steel and in which the entire surface of the face upon which the gears operate and the end of the crescent may be machined, honed and lapped at the same time, and when completed to insure square corners about the base of the crescent, and the lapped surface of the crescent and the lapped surface of the face of the crescent carrying element be maintained in parallel planes.

The advantages of such a method are obvious and this particular method provides the additional advantage that in the event the face upon which the gears operate becomes cut or scored, particularly about the ports, the crescent and pinion gear stud may be depressed and the entire surface re-machined, honed and lapped, producing a crescent element which is readily repairable.

With these and other objects in view, reference is made to the accompanying sheet of drawing which illustrates the various steps in carrying out this improved method, with the understanding that minor detailed changes may be made without departing from the scope thereof.

In the drawing;

Figure 1 is a view in vertical central section, taken on the line 2—2, Figure 2, illustrating the position of the crescent block when inserted in the crescent bushing in accordance with the first step of this improved method.

Figure 2 is a view in end elevation of Figure 1.

Figure 3 is a view in vertical central section, taken on the line 4—4 of Figure 4, illustrating the crescent bushing and crescent block after having been bored in accordance with the second step of this invention.

Figure 4 is a view in end elevation of Figure 3.

Figure 5 is a view in vertical central section, taken on the line 6—6 of Figure 6, illustrating the position of the parts after the insertion of the filler block and pinion gear stud in accordance with the third step of this improved method.

Figure 6 is a view in end elevation of Figure 5.

Figure 7 is a view in vertical central section, taken on the line 8—8 of Figure 8, illustrating the parts after the surface upon which the gears operate has been machined and the crescent and pinion gear stud have been forced above that surface in accordance with the fourth step in this invention.

Figure 8 is a view in end elevation of Figure 7.

Figure 9 is a view in end elevation similar to Figure 8 illustrating the pinion gear in position.

Figure 10 is a view similar to Figure 9 illustrating the internal gear in position.

Figure 11 is a view in side elevation of Figure 8 illustrating the discharge port in the crescent element.

In rotary gear pumps of internal gear type, the crescent carrying element is usually an integral cylindrical block which is held in fixed relation to the moving parts and may be provided with a plurality of ports, and in one type the intake port passes entirely through the body of the block while the discharge port is cut away from the perifery on the upper side of the block. Both sides of the gears are machined, surfaced and lapped, the pinion gear being rotatably mounted on the gear stud and the internal gear being secured to the rotor, the surface of which is also machined and lapped.

In carrying out this invention, the crescent carrying block is formed of several sections, an outer cylindrical bushing, a crescent block carried within the bushing, a filler block carried within the crescent block and bushing and a pinion gear stud carried on the filler block.

These portions are formed and built up in the following manner: The bushing 1 is a cylindrical block of the desired diameter, provided with a central concentric bore 2 of the same diameter as the diameter between the teeth of the internal gear to be employed therewith.

A crescent block 3 of the same diameter is then inserted within the bore 2 with a tight press fit with the upper portion 4 thereof projecting above the adjacent surface of the bushing for a distance slightly in excess of the thickness of the gears to be employed.

An eccentric bore 5 is then drilled in the crescent block. The distance between the center of the bushing and the center of the eccentric bore 5 being equal to the center distance between the gears to be employed whereby the eccentric bore 5 cuts away a portion of the interior of the wall of the bushing 1. The eccentric bore does not extend all the way through the crescent block and forms a shoulder 6 upon the interior of the bushing 1. The crescent block is then drilled concentrically with the eccentric bore 5 to form a passage-way 7 for the bearing stud of the pinion gear when applied.

A filler block 8 is then inserted in the bore 5 with a tight press fit to engage the shoulder 6. The filler block 8 mounts concentrically therein a pinion gear stud 9 with a tight press fit. The thickness of filler block corresponds to distance between shoulder 6 and the outer face of the bushing 1.

The crescent 10 formed by the eccentric bore 5 in the block 3 extends above the surface of the bushing which is then forced inwardly until the outer surface of the crescent 10 and the corresponding surfaces of the bushing 1, filler block 8, and stud 9, are approximately in line. This surface is then machined, honed and lapped.

It is preferable while the parts are in this position to drill the suction ports 11 and cut-out the discharge port 12 from the perifery and upper surface of the bushing, as shown in Figures 6, 8, 10 and 11.

The pinion gear stud 9 and the crescent block 3 are then forced in the opposite direction until the outer surface of the stud 9 and crescent 10 extend beyond the lapped surface of the bushing and filler block a distance equal to the thickness of the gears to be employed.

After the crescent element has been formed in the manner above described, the pinion gear 13 is mounted upon the stud 9, as shown in Figure 9. Figure 10 illustrates the internal gear 14 in the position assumed in its relation to the pinion gear and crescent 10.

By the above described method it is seen that upper surface of the crescent 10 and pinion gear stud 9 are machined, honed and lapped at the same time, so that when these surfaces are forced from the position shown in Figure 5 to that assumed in Figure 7 they will remain parallel to the surface of the element over which the gears operate. Likewise the outer surface of the crescent block 3 may be carefully machined as well as the inner surface of the bore 5 so that all of the surfaces of the crescent 10 extending above the machine or lapped surface of the element may be formed with precision and accurate right angles formed where the sides of the crescent contact the machined and lapped surface of the element.

Furthermore by this construction should the machined and lapped surface over which the gears operate become scored or cut, as sometimes occurs adjacent the ports, to such an extent as to impair the efficiency of the pump, the element may be removed, the stud 9 and crescent 10 depressed or forced inward to the position shown in Figure 5 and the members be resurfaced to form a machined, honed and lapped surface in the same manner as described in connection with Figure 5, and then the crescent and stud returned to the position shown in Figure 7.

What I claim is:

1. The method of manufacturing the crescent element for internal gear rotary pumps consisting in inserting within a bushing a concentric cylindrical block of a radius equalling the external radius of the crescent, machining an eccentric bore in said block of equal radius, forming the interior surface of the crescent, inserting a concentric cylindrical filler block in said eccentric bore, forming a machined and lapped surface upon the bushing, top of crescent and filler block, and then projecting the crescent above said lapped surface.

2. The method of manufacturing the crescent element for internal gear rotary pumps, consisting in inserting within a bushing a concentric cylindrical block of a radius equalling the external radius of the crescent, machining an eccentric bore in said block of equal radius forming the interior surface of the crescent, inserting a concentric cylindrical filler block in said eccentric bore, forming a bore in the filler block, concentric therewith, inserting a pinion gear stud in said filler block, forming a machined and lapped surface upon the bushing, top of the crescent filler block and top of the gear stud and then projecting the crescent and gear stud above said lapped surface.

3. The method of manufacturing the crescent element for internal gear rotary pumps consisting in inserting within a bushing a concentric cylindrical block of a radius equalling the external radius of the crescent, machining an eccentric bore partially through said block of equal radius from the interior surface of the crescent and forming a shoulder upon said bushing, inserting a concentric cylindrical filler block in said eccentric bore to engage said shoulder, forming a machined and lapped surface upon the bushing, top of the crescent and filler block, and then projecting the crescent above said lapped surface.

4. The method of manufacturing the crescent element for interior gear rotary pumps, consisting in inserting within a cylindrical bushing a concentric filler block of a radius equalling the external radius of the crescent, machining an eccentric bore partially through said filler block of equal radius from the interior surface of the crescent and forming a shoulder upon said bushing, inserting a concentric cylindrical filler block in said eccentric bore to engage said shoulder, forming a bore in the filler block concentric therewith and through the bottom of the crescent block, inserting a pinion gear stud in said filler block, depressing the filler block to engage said shoulder and depressing said gear stud and crescent to aline their respective tops with the top of the bushing, forming a machined and lapped surface upon the bushing, top of the gear stud and filler block and then projecting the crescent and gear stud above said lapped surface.

5. The method of manufacturing the crescent element for internal gear rotary pumps consisting in machining a concentric bore of a diameter equalling the diameter of the internal gear therefore through a cylindrical bushing, inserting a crescent block for a tight press fit therein to expose a portion thereof above the bushing equalling the thickness of the gears, machining a bore partially through said block and bushing eccentrically to said first bore, the eccentricity of which equals the center distance between gears to provide a shoulder in the bushing and drilling a concentric passage-way through the bottom of said crescent block, inserting a filler block in said eccentric bore having a tight press fit therewith and mounting a concentric pinion gear stud having a tight press fit in said filler block, forcing the exposed crescent block and gear stud inwardly to aline with the bushing and filler block, machining and honing the surfaces thereof to form a continuous lapped surface, and then forcing the crescent and stud in the opposite direction until the upper surface thereof extends above said lapped surface a distance equalling the thickness of the gears.

ROBERT R. WITHERELL.